C. ELLIS.
APPARATUS FOR PRODUCING CEMENT.
APPLICATION FILED MAY 7, 1909.
999,492.
Patented Aug. 1, 1911.
2 SHEETS—SHEET 1.
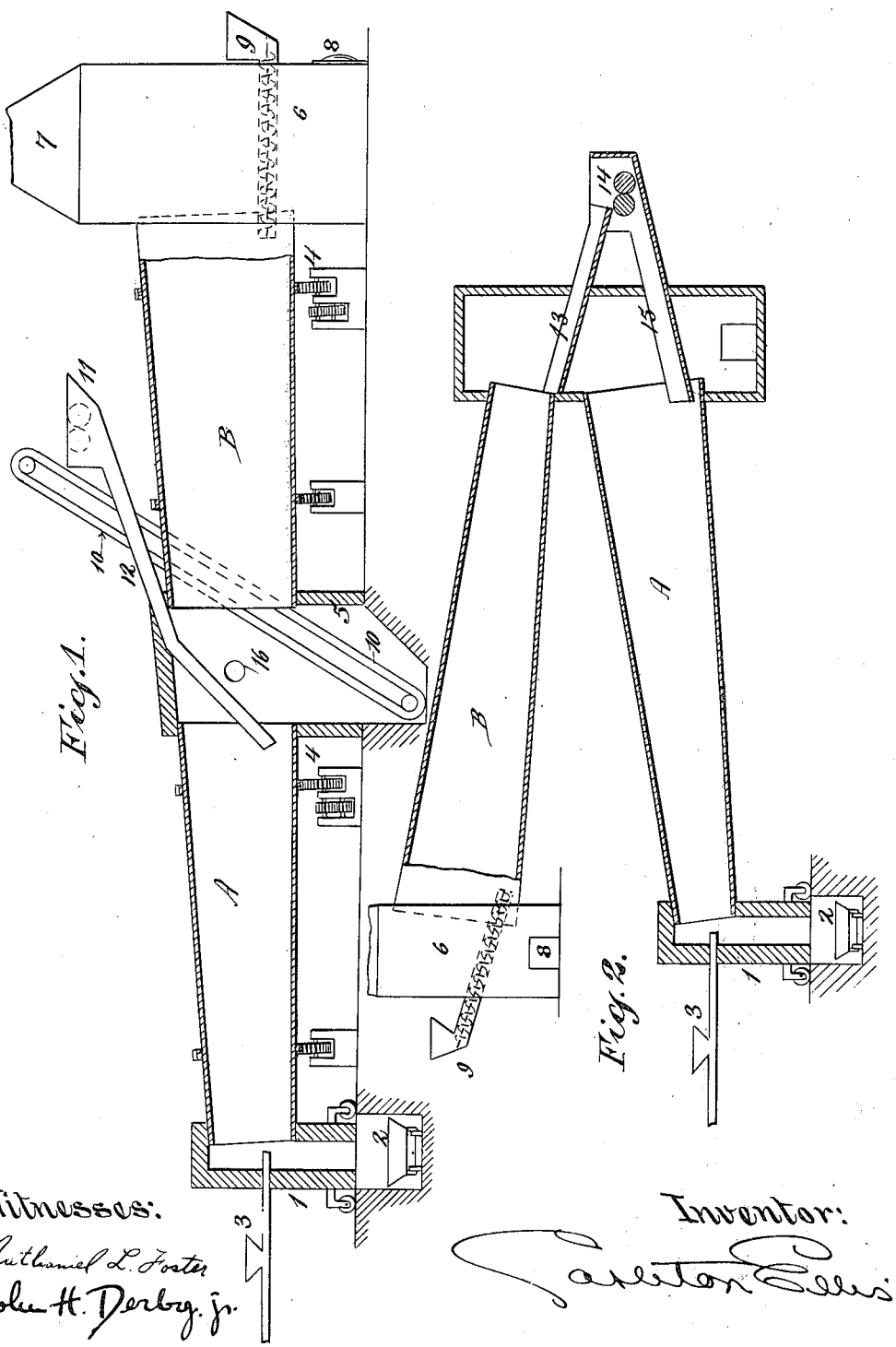

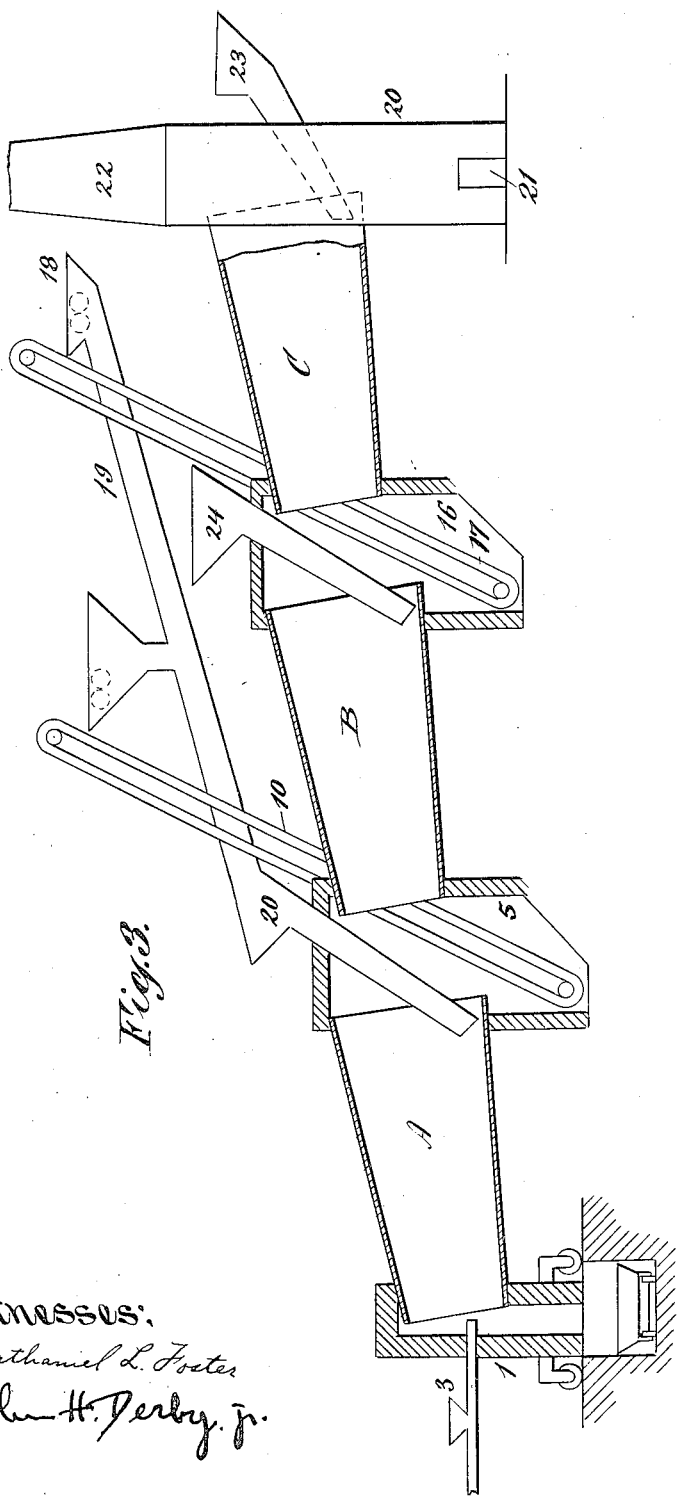

UNITED STATES PATENT OFFICE.

CARLETON ELLIS, OF LARCHMONT, NEW YORK, ASSIGNOR TO ELLIS-FOSTER COMPANY, A CORPORATION OF NEW JERSEY.

APPARATUS FOR PRODUCING CEMENT.

999,492.

Specification of Letters Patent.  Patented Aug. 1, 1911.

Application filed May 7, 1909. Serial No. 494,699.

*To all whom it may concern:*

Be it known that I, CARLETON ELLIS, citizen of the United States, residing at Larchmont, in the county of Westchester and State of New York, have invented certain new and useful Improvements in Apparatus for Producing Cement, of which the following is a specification.

This invention relates to apparatus for producing cement; and comprises apparatus for producing cement clinker wherein the coarsely ground raw materials are passed downward through a rotary kiln against a stream of hot gases of progressively increasing velocity until calcined or partially so, are thereafter fine ground and returned to a rotary kiln for clinkering by a suitable flame and flame gases of progressively increasing speed of transmission; and it also comprises an apparatus for producing cement embracing a pair of coned rotary inclined kilns arranged in series with the lowermost having flame producing means in its mouth, and the uppermost provided with means for removing waste gases, and intercalated means between said kilns for removing and regrinding the material coming from the upper kiln prior to introduction into the lower kiln: all as more fully hereinafter set forth and claimed.

In the method of producing cement clinker customarily employed in this country, finely ground raw materials are passed as a traveling stream downward through a rotary inclined horizontal kiln against a current of flame gases and flame coming from a flame of powdered coal burning in aerial suspension in the mouth of the kiln. These raw materials may be artificially mixed clay and some form of calcium carbonate, such as limestone, shells, marble, etc., or the raw material used may be finely ground cement rock, that is, a clayey limestone or marl containing intimately mixed calcium carbonate and clay components. As cement rock rarely possesses the exact composition required for good Portland cement, the ground rock usually receives an addition of the lacking component. In their downward progress of the materials through the kiln, their components suffer a number of changes of which the most important may be said to be the removal of combined moisture from the clay component and the removal of carbon dioxid from the calcium carbonate component to form calcium oxid, and the subsequent combination of the clay with the calcium oxid to form new compounds. The dehydration and the causticizing of the lime together are called (though the name properly belongs to the latter step) calcining while the subsequent union of the lime and the silicates is called clinkering. For the best and most economical results, these various reactions should be spatially separated in the kiln but this is rarely done. so that the zones in which the reactions take place overlap somewhat in the usual operation of the usual kiln.

The preliminary fine grinding of the material is partly to bring it in a shape in which it will progress downward through the kiln in the desired traveling stream and to produce the intimate commixture of the various ingredients which is necessary to make good and uniform cement clinker. This preliminary fine grinding is expensive, and particularly so where, as is the rule in this country, the materials are ground together dry. While there are soft forms of calcium carbonate such as marl, these are not so often employed as they are bulky, taking up too much space in the kiln, and for other reasons. The dimensions of the kiln and the thickness of the traveling layer which can be fed through it are correlated and limited by a number of conditions and the thickness of the traveling layer cannot exceed a certain maximum. With bulky components in the mixture, there is too little of the mixture passing downward in the traveling stream in a time unit. For similar reasons, ground slate is often used in lieu of clay. Dry comminution of the hard, dense limestones of slate or of cement rock is, however, difficult and expensive, and particularly so in this case since the fineness required is extreme.

In the present invention, I have devised a method of and means for reducing the expense in this particular, and also of accomplishing certain other desirable results.

The clay or slate component of the mixture when heated to a proper temperature, loses its water of hydration and with it, its dense hard character, becoming much more friable. The roasted material is indefinitely porous and may easily be ground without a great expense for power. Similarly, the calcium carbonate component upon being deprived of its carbon dioxid in calcination, loses its rock-like structure, in the case of limestone and cement rock, becoming a porous, easily comminuted body. In order to accomplish this result and make limestone or cement rock much more easily comminuted, it is not necessary that calcination be complete, since removal of any part of the carbon dioxid makes it more easily ground. The more carbon dioxid is expelled however, the more easily ground the material becomes. Perfect calcination is therefore desirable. Soft and bulky calcareous materials, such as marl and shells on the other hand, though not softened to so great an extent by calcination, do shrink materially in bulk; an equally desirable result. Therefore, by dehydrating the clay component of the mixture, and calcining the calcareous component, the mixture becomes friable and easily ground while other advantages accrue. In the dehydrating and calcining stages it is not necessary to have the materials finely ground.

In the usual operation of the usual type of kilns, as stated, a flame plume of powdered coal or other combustible burns in the mouth of the kiln, spaced away from the traveling stream of material therebeneath. By the intense heat radiating from this flame in its immediate vicinity, the temperature of the traveling stream immediately under its influence is raised to a very high degree and the clinkering operation takes place. The flame gases traveling upward through the kiln similarly raise the upper portion of the stream to a high temperature, though not nearly so high as that prevailing in the clinkering zone, successively calcining and dehydrating the material. As stated however, these several reactions are rarely spatially separated, the material usually coming into the clinkering zone imperfectly calcined and into the calcining zone imperfectly dehydrated. One reason for this is that the kiln is usually a cylinder of substantially uniform diameter throughout and the hot gases from the clinkering flame rising into the arch of the kiln must impart their heat to the calcining and dehydrating material through a space nearly equal to the diameter of the kiln. As radiation from hot gases is not very efficient, calcination and dehydration in the usual kiln are similarly imperfect prior to the entry of the material into the clinkering zone. Much of the calcination is done in the clinkering zone and since calcination absorbs many heat units there is a sudden chemical cooling at this point which is responsible for the formation of rings, nigger-heads, etc. As soon as the gases in their upward progress through the kiln drop in temperature so far that heat can no longer be efficiently propagated through 6 or 7 feet, they must be discharged, though still very hot. This is one of the reasons why the ordinary cement kiln requires several times as much fuel in its operation as is theoretically necessary.

By re-arranging the conditions of the kiln somewhat, the absorption of heat from the flame gases can be made efficient and thereby the calcination much improved. With this improved calcination comes an improvement in the friability of the material, rendering regrinding easier. One way of securing this improved utilization of the heat units of the flame gases is to give the kiln an upward taper or coning so that there is a progressive increase in diameter upward. While this upward coning apparently should merely increase the spacing away of the hot gases from the traveling stream of material and thereby diminish efficiency, as a matter of fact this result does not happen. Where in the cylindrical kiln the hot gases tend to travel forward in the arch of the kiln as a discrete stream, underlaid by a stream of air brought into the kiln by the injector action of the coal flame, this in turn being underlaid by still a third layer of heavy, dense, carbon-dioxid evolved in the calcining material, with the draft conditions rearranged by coning the kilns, a vertical mixing of the gases is produced which brings the heat down near the material to be heated. The upward coning of the kiln is very efficient in producing vortices which tend to good admixtures of the gases, and the existence of separate traveling strata becomes hardly possible. Furthermore, gases passing at a given rate of speed through a conduit of given diameter, of course lose materially in speed in passing through a conduit of larger diameter, the speed of transmission being inversely proportional to the cross-sectional area of the conduit offered. In producing an intensely hot clinkering flame it is substantially necessary to have a quick movement of the gases in the mouth of the kiln. Such a quick movement, however, is not desirable in the upper end of the kiln since it tends to promote dusting and for other reasons. As the carbon dioxid is evolved from the finely powdered material, it tends to throw up dust which a rapidly moving gas current will pick up and remove from the kiln. By coning the kiln therefore, the desired quick movement in the mouth and slow movement in the upper end are produced. With a kiln constructed in this shape, the amount of air entering the mouth of the kiln may be usefully restricted to merely that necessary to produce intense combustion in the clinkering flame without a large excess to pass upward through the kiln as a distinct stream. With a coned kiln having a restricted access of air, an efficient gas mixture and calcination are secured. As the calcination absorbs much heat from the gases thereby reducing their volume, in a kiln operating in the manner described there is a reduction in the gas speed in the upper portion of the kiln more than concomitant to the increase in diameter. This is desirable as still further reducing dusting.

Very advantageously the kiln may be constructed in sections each having an independent coning with intercalated means for removing and regrinding calcines between the sections. With a lower coned kiln section having flame producing means in its narrow end and its upper broader end revolving in a stationary housing in which passes the lower or narrow end of a similar coned kiln section, the chamber of the housing forms a very efficient gas mixing means. The upper kiln section may deliver calcined or partially calcined material into a pit in the housing chamber and the calcined material may be thence removed to a suitable grinding apparatus, reground and returned to the lower kiln section. The calcined material passing through the narrow end of the upper coned section is brought into intimate contact with a rapidly moving stream of very hot gases, thereby tending to a marked improvement of the calcination.

The coned sections may be set in line or may be superimposed. This latter arrangement has several advantages, one being that the feed end of the upper section and the discharge end of the lower section are brought on the same side, while the driving mechanism may be put on the other. This is mechanically advantageous and is also useful as removing the mechanism from the influence of dust to some extent. Furthermore, with superimposed kiln sections of this type connected by a stationary housing, the gas strata from the lower kiln tend to become very thoroughly mixed. It will be obvious that if two layers of gas exist in the lower section and these layers pass outward into a stationary housing, go upward therethrough at right angles and then suffer another right-angle bend to pass through a horizontal kiln in the opposite direction, the lower stratum tends to become the upper and vice versa. This effect tends very much toward the desired good mixture of the gases in the kiln.

In the embodiment of this invention as at present preferred therefore, I pass the raw material, which may be cement rock with admixtures, or may be limestone and clay or slate in a coarsely ground condition, downward through a coned rotary kiln section against a current of hot flame gases passing in the opposite direction to produce calcination, remove the calcined materials and fine grind, and return the fine ground materials to another coned kiln section through which they pass downward in the opposite direction to flame gases and flame from a clinkering flame, these flame gases afterward passing into the upper kiln section and there serving to produce calcination. There may be more than two sections, and when this is the case, in using slate or clay to be mixed with limestone or other form of calcium carbonate, the two components may be separately treated in separate sections and united in the regrinding apparatus. These separate sections for the preliminary operations may be mounted in series or in parallel. In the former case, the clay is best treated in the kiln section receiving gases from the section in which the limestone is treated. Where the kiln sections are in parallel the flame gases coming from the clinkering section may be divided between the two sections treating raw material in any suitable fractions.

In the accompanying illustration, I have shown more or less diagrammatically, sundry embodiments of apparatus elements capable of use in the described process.

In this showing:—Figure 1 is a vertical longitudinal section showing a pair of coned kilns in line with intermediate regrinding means; Fig. 2 is a similar view of a pair of superimposed coned kiln sections; and Fig. 3 is a similar view of a structure comprising three coned kiln sections in line.

In the showing of Fig. 1, A and B are respectively the lower and upper coned kiln sections. The former is provided with the usual movable housing or hood 1, discharging clinker into clinker pit 2, and provided with firing means 3. As shown, this kiln section has an upward coning or taper and is set at such an angle that material will feed downward through it upon rotation. It is provided with the customary driving means 4. At its upper end this kiln section enters stationary housing 5 into which the upper kiln section also enters. The upper kiln section at its other end enters a stationary casing 6 provided with chimney or stack 7, and having a dust door 8. Passing through the wall of this casing is a duct 9 adapted to deliver coarsely ground raw materials into kiln B. The intermediate housing between the kiln sections is provided with means 10 for removing calcined material and delivering the same to regrinding means 11, which deliver ground materials through duct 12 to the lower kiln section.

The structure of Fig. 2 operates in practically the same manner as that of Fig. 1, but the kiln sections are located one above the other and the calcined material coming from B passes through chute 13 to regrinding means 14 and thence by chute 15 to the lower or clinkering section.

In the structure of Fig. 3, the kiln is divided into sections A, B and C intended respectively for clinkering, for calcination of the calcium carbonate component and for dehydration of the clay or slate component. In this structure as shown the lower kiln section A is provided with firing means, hood and clinker pit as in the foregoing figures. The intermediate housing between the sections A and B has the same functions as in the preceding figures. The upper end of the calciner B, however, enters another stationary housing 16 provided with means for removing the treated material 17 and delivering the same to regrinding means 18, whence a duct 19 conveys the ground material to the feed means 20 of the clinker kiln. Entering this second intermediate housing is the lower end of the coned dehydrating kiln, C. The upper end of this dehydrating section enters housing 20 provided with dust door 21, stack 22 and feed means 23. A separate feed means 24 delivers limestone or marl to the calcining section B.

The operation of these structures is obvious from the foregoing.

Taking Fig. 1, the coarsely ground raw material enters the upper or calcining section B and is there calcined by the hot flame gases coming from the firing means 3 through section A. The material more or less calcined, but preferably nearly completely calcined, at least, is delivered into housing 5 whence conveyer 10 takes it up to the grinder. This apparatus reduces it to the customary fine or impalpable powder which is treated in section A to form clinker, the calcination if not already complete, being completed in the upper end of A. Passing downward through A the material comes under the influence of the intensely hot clinkering flame produced by 3, and is converted into cement clinker which drops into clinker pit 2. The clinkering flame may be produced as usual by powdered coal carried in by a jet of air under pressure. The air thus introduced and the heated air ascending from the clinker pit suffice to produce an intensely hot flame. The total amount of air entering for this purpose should be restricted to about that amount theoretically necessary, access of air through the customary sight holes and patching holes (not shown) in housing 1 being taken into consideration. The access of air through the clinker pit may be controlled by suitable dampers, etc., (not shown). The amount of air used in introducing the coal may be varied to secure about the right total amount. The flame burning in the narrow mouth of A produces a maximum velocity of gas travel at this point, materially aiding in suspending the flame in the way desired. Toward this end of the kiln also, the clinkering materials are brought into close proximity with the flame, thereby reducing materially the amount of fuel necessary, and the hot flame gases passing upward through the coned kiln are vortically mixed in a way tending to good utilization of heat while restricting the access of air, the tendency to stratification is also much diminished. The body of hot gases going into stationary casing B is very thoroughly admixed, the cross section of the chamber of this casing being larger than that of the kiln. Passing into the narrow end of B they are once more brought into close contact with the material to be calcined at a point where calcination is far advanced and the need of heat is great and the cross-section of the prism of gas at this point being reduced, there is a sudden acceleration of speed which much enhances the desired mixture. Passing upward through B the gases are once more admixed in the same way as in A and by the time they reach the upper end their temperature, volume and speed are much reduced.

16 shows in diagrammatic fashion means for injection of a secondary full jet.

The structure of Fig. 2 operates in precisely the manner of Fig. 1, save that by superimposing the kiln section a reversal of the relative position of any gas strata which may be present is produced.

The structure of Fig. 3 is intended to operate somewhat differently, the several components of the cement material being separately heated, each under conditions best adapted to it, separately ground, admixed and then delivered into clinker section A for completion of the calcining if necessary and for clinkering. In the use of this structure clay or slate in a coarsely ground condition may be introduced into C through 23 and in its downward progress through C may be roasted in such a manner as to dehydrate it and make it friable. The roasted material is taken by 17, reground in 18 and delivered through 19 to mixing hopper 20. Limestone, marl, shells or other form of calcium carbonate in a coarsely ground condition is introduced into calcining section B through 24 and progresses downward therethrough against the current of hot flame gases by which it is calcined more or less completely. The calcines are delivered into housing 5, are removed thence by 10, reground to form a fine powder and delivered into mixing hopper 20 where they meet the fine ground dehydrated clay material. The mixture of the two is delivered into clinker section A and converted into clinker in the manner already described.

The foregoing drawings, which are diagrammatic, for the purpose of simplicity and clarity do not show any device for intimately mixing ground argillaceous and calcareous material, but when such a device is required obviously it may be introduced and operated in the manner well known in the art.

The successive kiln sections may be as shown of substantially the same diameter at the mouth, or they may be shaped and dimensioned as to present a substantially uniform taper upward throughout the apparatus. The former shape has the advantage that the gases coming from the wide end of one kiln and going through the narrow end of the next kiln section have their velocity locally increased which much promotes good admixture.

The several sections may be separately heated if desired by applying to the discharge end of each kiln an independent full jet or source of heat. Powdered coal, natural gas, producer gas, etc., may be used. Producer gas is satisfactory for calcining and powdered coal for clinkering.

What I claim is:—

1. A cement apparatus comprising a plurality of rotary inclined kiln sections, each being of progressively decreasing cross section from above downward, means for differentially heating the several sections, means for passing cement material successively through two or more of said sections and means for removing, regrinding and restoring material in transit intermediate two such sections.

2. A cement apparatus comprising a plurality of rotary inclined kiln sections, means for producing differential heating in such sections, means for feeding argillaceous material to one such section, means for feeding calcareous material to another such section, separate means for removing and regrinding the materials from each such section and means for uniting the reground argillaceous and calcareous materials and feeding into another such section for clinkering.

3. A cement apparatus comprising a plurality of rotary inclined kiln sections, means for producing differential heating in such sections, means for feeding argillaceous material to one such section, means for feeding calcareous material to another such section, separate means for removing and regrinding the materials from each such section, and means for uniting the reground argillaceous and calcareous materials and feeding into another such section for clinkering, the heating means being adapted to produce a continuous flow of heating gases in succession through the clinkering section, the section for calcareous material and the section for argillaceous material.

4. A cement apparatus comprising a plurality of rotary inclined kiln sections of progressively increasing upward diameter, means for producing differential heating in such sections, means for feeding argillaceous material to one such section, means for feeding calcareous material to another such section, separate means for removing and regrinding the materials from each such section and means for uniting the reground argillaceous and calcareous materials and feeding into another such section for clinkering.

5. A cement apparatus comprising a plurality of rotary inclined kiln sections of progressively increasing upward diameter, means for producing differential heating in such sections, means for feeding argillaceous material to one such section, means for feeding calcareous material to another such section, separate means for removing and regrinding the materials from each such section, and means for uniting the reground argillaceous and calcareous materials and feeding into another such section for clinkering, the heating means being adapted to produce a continuous flow of heating gases in succession through the clinkering section, the section for calcareous material and the section for argillaceous material.

6. A cement apparatus comprising a plurality of rotary inclined kiln sections, each of progressively increasing upward diameter arranged in series, firing means for the lowermost section, waste gas removing means for the uppermost section, a stationary housing connecting the uppermost end of each lower section and the lowermost end of such upper section, and means for collecting and regrinding the materials delivered into such housing by the upper section and returning the ground materials into the lower section.

7. A cement apparatus comprising at least three rotary inclined kiln sections, each being of successively increasing upward diameter, firing means for one such section, connections for delivering heating gases from fired section into the other sections, means for delivering coarsely ground material into each such other section. separate means for regrinding materials delivered from each such other section and means for mixing and uniting the reground materials and delivering the mixture into the fired section.

8. A cement apparatus comprising at least three rotary inclined kiln sections, each of progressively increasing upward diameter arranged in series, firing means for the lowermost section, waste gas removing means for the uppermost section, a stationary housing connecting the first section with the next upward section in series, a housing connecting the uppermost section with the next downward section, means for introducing coarsely ground material into said uppermost section, means for removing and regrinding material delivered to the housing therebelow, means for introducing coarsely ground material into an intermediate section, means for removing and regrinding material from the housing above the fired section and means for mixing the ground materials and for delivering the mixture into the fired section.

In testimony whereof I have affixed my signature in presence of two witnesses.

CARLETON ELLIS.

Witnesses:
  NATHANIEL L. FOSTER,
  FRANCES I. NEWMAN.